United States Patent [19]

Bosshard

[11] 4,074,138
[45] Feb. 14, 1978

[54] APPARATUS FOR TREATING LIQUID SLUDGE MATERIAL

[75] Inventor: Ernst Bosshard, Winterthur, Switzerland

[73] Assignee: Sulzer Brothers Limited, Winterthur, Switzerland

[21] Appl. No.: 552,936

[22] Filed: Feb. 25, 1975

[30] Foreign Application Priority Data

Dec. 23, 1974  Switzerland .................... 17238/74

[51] Int. Cl.² .................... G01N 21/24; G01N 21/26; G01N 23/10; G01N 23/20
[52] U.S. Cl. .................................. 250/435; 250/433; 250/492 R
[58] Field of Search .................... 250/491, 492 B, 392, 250/399, 435, 434, 432, 433, 239, 360

[56] References Cited

U.S. PATENT DOCUMENTS

| | | | |
|---|---|---|---|
| 2,855,518 | 10/1958 | Foley et al. | 250/491 |
| 2,921,006 | 1/1960 | Schmitz et al. | 250/492 B |
| 3,015,129 | 1/1962 | Hays et al. | 250/239 |
| 3,081,485 | 3/1963 | Steigerwald | 250/492 B |
| 3,501,391 | 3/1970 | Smith et al. | 250/492 B |
| 3,649,726 | 3/1972 | Knowles | 250/360 |

*Primary Examiner*—Alfred E. Smith
*Assistant Examiner*—David K. Moore
*Attorney, Agent, or Firm*—Kenyon & Kenyon, Reilly, Carr & Chapin

[57] ABSTRACT

The material being treated flows out of a hopper in a thin layer onto a rotating drum and is moved through an irradiation zone formed by an electron beam which is directed radially at the drum. The hopper may use an adjustable metering edge or rotatable metering roller to vary the thickness of the layer of material on the drum.

10 Claims, 3 Drawing Figures

APPARATUS FOR TREATING LIQUID SLUDGE MATERIAL

This invention relates to an apparatus for treating liquid material by means of electron beams.

It has been known to hygienize clarified sludge by conveying the sludge through an irradiation zone formed by an electron beam by means of a pump in the form of an open screw pump. However, the sludge generally moves about in an erratic manner under such conditions with the result that it is difficult to ensure a uniform dose distribution.

Accordingly, it is an object of the invention to obtain a uniform dose distribution of a liquid material in an irradiation zone formed by an electron beam.

Briefly, the invention provides an apparatus for treating liquid material which comprises a transport means for conveying the material in a thin layer and an electron beam generator for irradiating the material. The transport means includes a cylindrical drum and means for applying the material onto the drum in a thin layer while the electron beam generator directs an electron beam radially onto the drum to define the irradiation zone.

The means for applying the material to the drum preferably comprises a hopper which rests on the drum periphery. In order to adjust the thickness of the layer of material on the drum, the hopper may be provided with an adjustable stripper or calibrating edge.

If a coating of solids becomes deposited on the stripper edge, the thickness of the layer gradually and increasingly deviates from the value to which the layer has been set. In order to obviate this, the hopper may have a calibrating roller on the downstream side which rotates at a lower circumferential speed than the drum and in the opposite direction. The drum may have turned surfaces on both sides and the end walls of the hopper may touch the shoulders of the turned surfaces and bear on the journal faces of the turned surfaces.

A stripper blade may also be provided to completely detach the irradiated material from the drum.

These and other objects and advantages of the invention will become more apparent from the following detailed description and appended claims taken in conjunction with the accompanying drawings in which:

Figure 1:
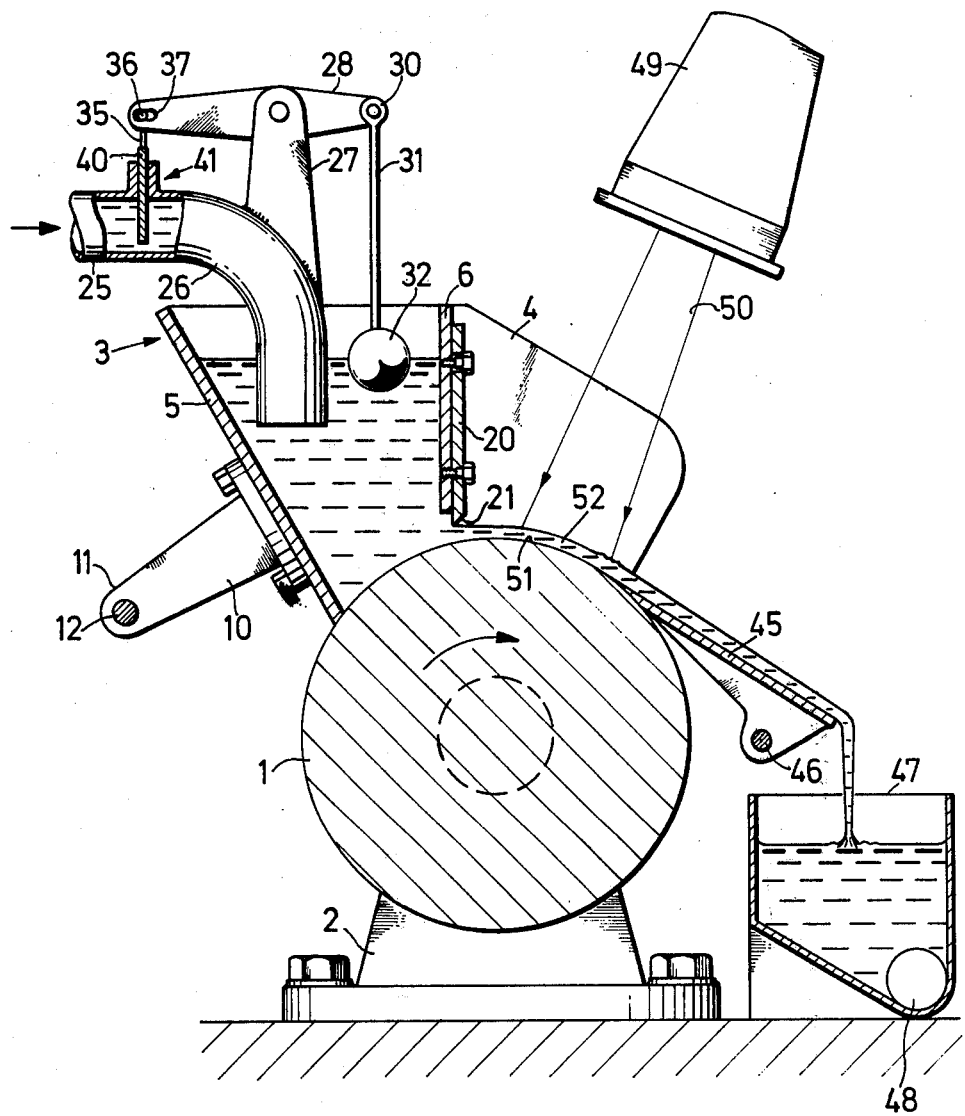
FIG. 1 illustrates a cross-sectional view of an apparatus according to the invention.

Referring to FIG. 1, the apparatus for treating liquid material includes a hopper 3 comprising two sidewalls 4, a front wall 5 and a back wall 6 welded together. The hopper 3 rests on a rotatable drum 1 mounted on two bearing brackets 2. Two flanged arms 10 are bolted to the front wall 5 of the hopper 3 and the free ends 11 of the arms 10 are rotatable about a fixed shaft 12. A calibrating or dosing means in the form of a metering plate 20 having a sharp metering edge 21 is bolted to the back wall 6 of the hopper 3 so as to be vertically adjustable relative to the drum 1. As shown, the metering plate 20 is near the vertex of the drum 1 and constitutes a wall of the hopper 3.

A feed pipe 25 for a liquid for irradiation leads into the hopper 3 via a bend 26. In order to control the flow of liquid into the hopper a control system is provided. This system includes a pair of arms 27 mounted on the feed pipe 25 between which a two-armed lever 28 is secured. A rod 31 is articulated on one end 30 of the lever 28 and carries a float 32 at the free end. A rod 35 engages the other end of the lever 28 through a slot 37 by means of a transverse pin 36. The rod 35 carries a closure member 40 of a throttle member 41 within the feed pipe 25 to throttle the liquid flow.

A stripper blade 45 pivotable about a fixed shaft 46 is disposed on the downstream side of the hopper 3. A collector 47 for the irradiated material is disposed beneath the outlet edge of the stripper blade 45. The irradiated material is discharged from the collector 47 via an outlet 48.

An electron beam generator 49 directs an electron beam 50 into the area between the metering plate 20 of the hopper 3 and the stripper blade 45 substantially radially against the drum 1 to define an irradiation zone on the material carried by the drum 1 past the beam 50.

When the apparatus is in operation, the material for irradiation flows via the feed pipe 25 into the hopper 3, the level to which the hopper 3 is filled being controlled to a constant value by the control system 32, 31, 28, 35, 40. The drum 1 is driven at constant speed by a motor (not shown) and rotates in the clockwise direction. In this way, a layer 52 of material of a thickness of about 1 millimeter (mm) forms on the surface 51 of the drum 1 to the right of the metering edge 21. This layer 52 is peeled off by the stripper blade 45 which is disposed in the direction of rotation downstream of the hopper 3 and the irradiation zone and fed to the collector 47. The electron beam 50 swings back and forth between the side walls 4 along a generatrix of the drum 1. The electron beam may at the same time be periodically offset line-fashion in the peripheral direction so that the beam exit window of the electron beam generator 49 is not subjected to too high a thermal loading. The deflection of the electron beam is adjusted to the circumferential speed of the drum 1 in such a manner that the material is uniformly irradiated. The hygienization effect is obtained, on the one hand, by the direct action of the electron beams and on the other hand by the action of the gamma radiation forming on the retardation of the electron beams.

Figures 2, 3:
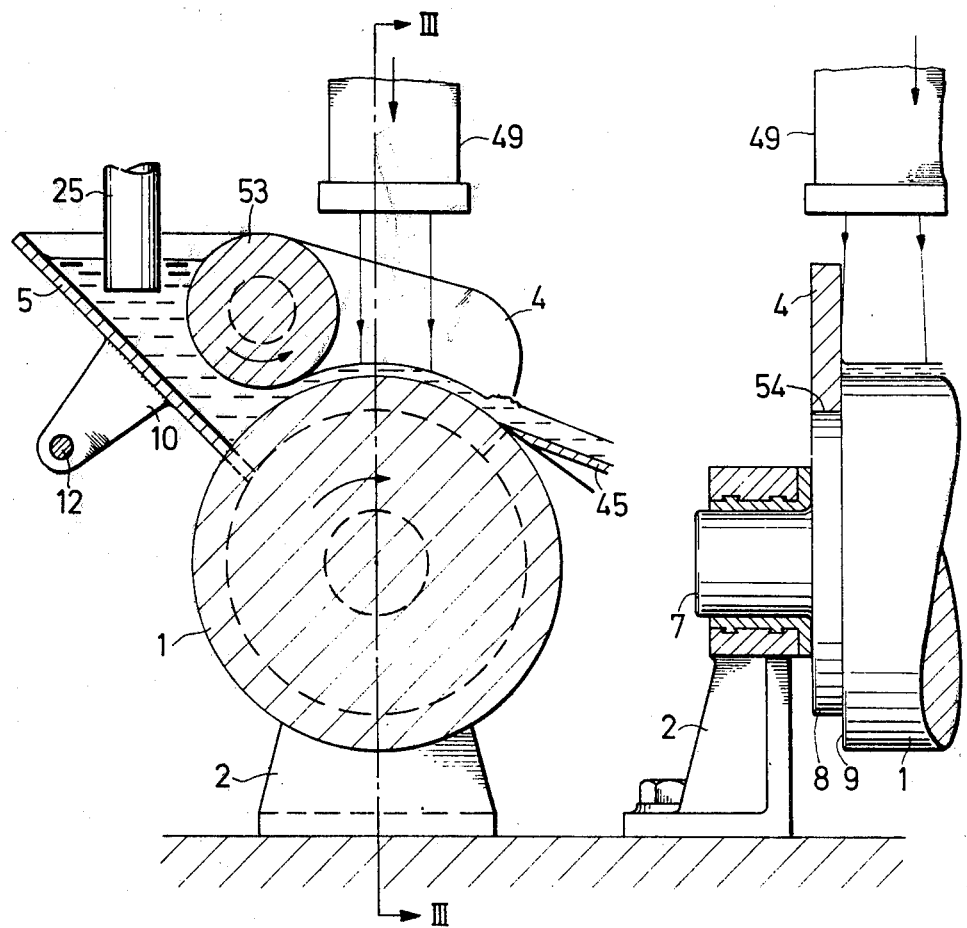
FIG. 2 illustrates a modified apparatus according to the invention.
FIG. 3 illustrates a longitudinal sectional view of part of the apparatus according to FIG. 2 taken on line III—III of FIG. 2.

A coating of solids may be deposited at the metering edge 21 depending upon the composition and/or concentration of the material for irradiation so that the layer thickness 52 of the material on the drum 1 will deviate from the original value to which the layer has been set. To obviate this, as shown in FIG. 2, the back wall 6 of the hopper 3 is replaced by a metering or calibrating roller 53 which rotates in the counter-clockwise direction, as viewed; and at a lower circumferential speed than the drum 1 which rotates clockwise. As shown, the roller 53 is near the vertex of the drum 1 and constitutes a wall of the hopper 3. As will be apparent from FIG. 3, the side walls 4 of the hopper 3 are not supported on the circumferential surface of the drum 1 but on turned surfaces 54 of the drum 1. Each surface 54 forms a shoulder 9 with respect to which a side wall 4 of the hopper 3 has only a slight axial clearance. At the same time, each side wall 4 bears on the journal face of a turned surface 54. The advantage of this is that no uneven wear occurs at the drum 1. In addition, sealing with respect to lateral outflow of the material for irradiation is improved. If necessary, the turned surface 54 may be additionally lubricated, for example with clean water.

What is claimed is:

1. In an apparatus for treating sludge with electron beam radiation, the combination of
   a rotatably driven drum for conveying the sludge to be treated;
   means including a hopper of sludge for applying the sludge onto said drum in a thin layer and a metering plate near the vertex of said drum constituting a wall of said hopper for determining the thickness of the layer of sludge on said drum; and
   an electron beam generator for directing an electron beam radially onto said drum to define an irradiation zone on the sludge carried past said electron beam on said drum and to swing said beam back and forth along a generatrix of said drum.

2. An apparatus as set forth in claim 1 which further includes a stripper blade touching the drum surface and disposed in the direction of rotation downstream of said hopper and said irradiation zone.

3. An apparatus as set forth in claim 1 wherein said metering plate is adjustably mounted on said hopper relative to said drum.

4. Apparatus for treating liquid material with electron radiation, comprising
   a hopper containing the material;
   a drum mounted for driven rotation with respect to said hopper to receive material from said hopper on the circumference thereof;
   a calibrating roller near the vertex of said drum for rotation in an opposite direction, said roller constituting a wall of said hopper for causing the received material to be applied in a thin layer on said circumference of said drum; and
   an electron beam generator for directing an electron beam radially onto said drum to define an irradiation zone on said material carried by said drum past said electron beam.

5. An apparatus as set forth in claim 4 wherein said calibrating roller is disposed for rotation at a lower circumferential speed than said drum.

6. An apparatus as set forth in claim 4 wherein said hopper rests on said drum.

7. An apparatus as set forth in claim 6 wherein said drum has shoulders at opposite sides and said hopper has side walls bearing on said shoulders and an upstream wall bearing on the circumference of said drum.

8. An apparatus as set forth in claim 4 which further includes a stripper blade touching the circumferential surface of said drum and disposed in the direction of rotation downstream of said hopper and said irradiation zone.

9. Apparatus for treating liquid material with electron radiation, comprising
   a hopper containing the material and having end walls and an upstream wall;
   a drum mounted for driven rotation with respect to said hopper to receive material from said hopper on the circumference thereof, said drum having turned shoulders, said end walls of said hopper bearing on said shoulders and said upstream wall of said hopper bearing on said circumference of said drum;
   calibrating means for causing the received material to be applied in a thin layer on said circumference of said drum; and
   an electron beam generator for directing an electron beam radially onto said drum to define an irradiation zone on said material carried by said drum past said electron beam.

10. An apparatus as set forth in claim 4 wherein said electron beam swings back and forth along a generatrix of said drum.

* * * * *